United States Patent
Garceau et al.

(10) Patent No.: US 12,221,158 B2
(45) Date of Patent: Feb. 11, 2025

(54) SPRING HANGER FOR TRAILER FRAME

(71) Applicant: NORCO INDUSTRIES, INC., Compton, CA (US)

(72) Inventors: Bernard F. Garceau, Vandalia, MI (US); William A. Aske, Cassopolis, MI (US); Leonard D. Yoder, Elkhart, IN (US)

(73) Assignee: NORCO INDUSTRIES, INC., Compton, CA (US)

( * ) Notice: Subject to any disclaimer, the term of this patent is extended or adjusted under 35 U.S.C. 154(b) by 0 days.

(21) Appl. No.: 18/354,900

(22) Filed: Jul. 19, 2023

(65) Prior Publication Data

US 2023/0365196 A1  Nov. 16, 2023

Related U.S. Application Data

(63) Continuation of application No. 17/497,520, filed on Oct. 8, 2021, now Pat. No. 11,745,799.

(60) Provisional application No. 63/091,088, filed on Oct. 13, 2020.

(51) Int. Cl.
  *B62D 21/11* (2006.01)
  *B62D 21/20* (2006.01)

(52) U.S. Cl.
  CPC .............. *B62D 21/11* (2013.01); *B62D 21/20* (2013.01); *B60G 2206/601* (2013.01)

(58) Field of Classification Search
  CPC ........ B60G 2206/601; B60G 2204/121; B60G 2204/4302; B60G 11/02; B60G 11/04; B60G 2300/04; B60G 2202/11; B60G 2202/112; B62D 21/11; B62D 21/20
  See application file for complete search history.

(56) References Cited

U.S. PATENT DOCUMENTS

| | | | |
|---|---|---|---|
| 5,536,035 A | 7/1996 | Bautz et al. | |
| 6,932,388 B2 | 8/2005 | Few et al. | |
| 11,745,799 B2 * | 9/2023 | Garceau | B62D 21/20 280/788 |
| 2018/0029647 A1 | 2/2018 | Garceau | |
| 2022/0176763 A1 | 6/2022 | Ramasamy et al. | |

FOREIGN PATENT DOCUMENTS

| | | |
|---|---|---|
| JP | 09156336 A | 6/1997 |
| JP | 11034912 A | 2/1999 |
| JP | 11078456 A | 3/1999 |
| JP | 11099958 A | 4/1999 |
| JP | 2000108624 A | 4/2000 |

* cited by examiner

*Primary Examiner* — Laura Freedman
(74) *Attorney, Agent, or Firm* — Vorys, Sater, Seymour and Pease LLP; Mark A Watkins

(57) ABSTRACT

A spring hanger assembly may be formed pieces shaped to increase the stiffness and strength. The spring hanger assembly may comprise separate pieces, such as an inner section and an outer section. The spring hanger assembly may be attached to a frame using fasteners or hucks.

19 Claims, 5 Drawing Sheets

SPRING HANGER FOR TRAILER FRAME

This application claims priority benefit of U.S. Provisional Patent Application Ser. No. 63/091,088 filed Oct. 13, 2020, entitled "SPRING HANGER FOR TRAILER FRAME," and U.S. patent application Ser. No. 17/497,520 filed Oct. 8, 2021, entitled "SPRING HANGER FOR TRAILER FRAME," the complete disclosure of which, in its entirety, is herein incorporated by reference.

BACKGROUND

The present disclosure is related to vehicle frame assembly systems and, more particularly, to spring hangers that can be used with vehicle frames.

Spring hangers, also known as axle hangers, may be utilized in a variety of vehicle frames. For example, spring hangers may be utilized with trailer frames including those described in United States Patent Application Publication No. US2018/0029647, which is incorporated by reference herein in its entirety. Generally, spring hangers are U-brackets with simple one piece braces welded directly to the frame.

The present disclosure provides spring hangers with improved stiffness and strength and that are attached to the frame rail using fasteners. These and other advantages will be understood by those with skill in the art.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with some aspects of the present disclosure a spring hanger assembly is described. A spring hanger assembly includes an inner hanger section having a substantially planar top surface and a tab portion extending perpendicularly therefrom in a first direction. The spring hanger assembly also includes an outer hanger section including a substantially planar bottom surface configured to abut the substantially planar top surface, an outer tab portion extending in the first direction substantially perpendicular to the planar bottom surface, and at least one finger extending in a second direction, opposite the first direction and substantially perpendicular to the bottom surface. In a further embodiment, the inner tab and outer tab are in a spaced apart relationship and are configured to mount a suspension component therebetween. In another further embodiment, the outer hanger section and inner hanger section are joined together via fasteners. In another further embodiment, the outer hanger section includes two spaced apart figures each extending in the second direction. In another further embodiment, the hanger assembly further includes a first set of spaced apart assembly holes disposed in the top surface of the inner hanger section and a second set of spaced apart assembly holes disposed in the bottom surface of the outer hanger assembly, wherein the first set of assembly holes is configured to align with the second set of assembly holes and receive a fastener therethrough to couple the inner hanger section and outer hanger section. In another further embodiment, the hanger assembly further includes at least one mounting hole configured to receive a fastener to mount the hanger assembly to a frame rail. In another further embodiment, the inner hanger section is welded to the outer hanger section. In another further embodiment, the hanger assembly further includes a recess in the top surface of the inner hanger, wherein the outer tab portion of the outer hanger section occupies a portion of the recess when the outer hanger section is joined with the inner hanger section. In another further embodiment, the top surface further comprises a tongue extending in the recess, the tongue configured to abut an inner facing surface of the outer tab.

In accordance with another aspect of the present disclosure a spring hanger assembly system is described. An exemplary spring hanger assembly system includes at least two spaced apart spring hanger assemblies. Each spring hanger assembly includes an inner hanger section having a substantially planar top surface and a first tab portion extending in a first direction substantially perpendicular thereto and an outer hanger section including a substantially planar bottom surface configured to abut the substantially planar top surface, a second tab portion extending in the first direction substantially perpendicular to the planar bottom surface, and at least one finger extending in a second direction, opposite the first direction substantially perpendicular to the bottom surface. The first tab portion and second tab portion are configured to receive and mount a suspension component connecting the at least two spaced apart spring hangers. In a further embodiment, the suspension component is a leaf spring. In another further embodiment, the hanger assembly system further includes an equalizer having a front end and a read end, the equalizer rotatably connected between the first and second tab of a first spring hanger and a leaf spring having a first end connected between the first and second tab of a second spring hanger and a second end connected to a front end of the equalizer. In another further embodiment, the spring hanger assembly system further includes a third spring hanger, and a second leaf spring, wherein the second leaf spring has a first end connected between the first and second tab of the spring hanger and a second end connected to a rear end of the equalizer. In another further embodiment, the hanger assembly system further includes a shackle, wherein the shackle rotatably connects the second end of the spring hanger to the front end of the equalizer. In another further embodiment, each spring hanger assembly is fastened to a frame rail via fasteners. In another further embodiment, outer hanger section and inner hanger section are joined together via fasteners. In another further embodiment, the outer hanger section comprises two spaced apart figures extending in the second direction and configured to abut and mount to a frame rail. In another further embodiment, the inner hanger section is welded to the outer hanger section. In another further embodiment, the hanger assembly system further includes a recess in the top surface of each inner hanger section, wherein the outer tab portion of the outer hanger section occupies a portion of the recess when the outer hanger section is joined with the inner hanger section. In another further embodiment, the top surface further comprises a tongue extending in the recess, the tongue configured to abut an inner facing surface of the outer tab.

In another embodiment, a spring hanger assembly is disclosed, wherein the spring hanger assembly comprises an outer hanger section having a substantially planar top surface and a tab portion extending in a first direction substantially perpendicular thereto, and an inner hanger section including a substantially planar bottom surface configured to abut the substantially planar top surface, an outer tab portion extending in the first direction substantially perpendicular to the planar bottom surface, and at least one finger extending in a second direction, opposite the first direction substantially perpendicular to the bottom surface.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
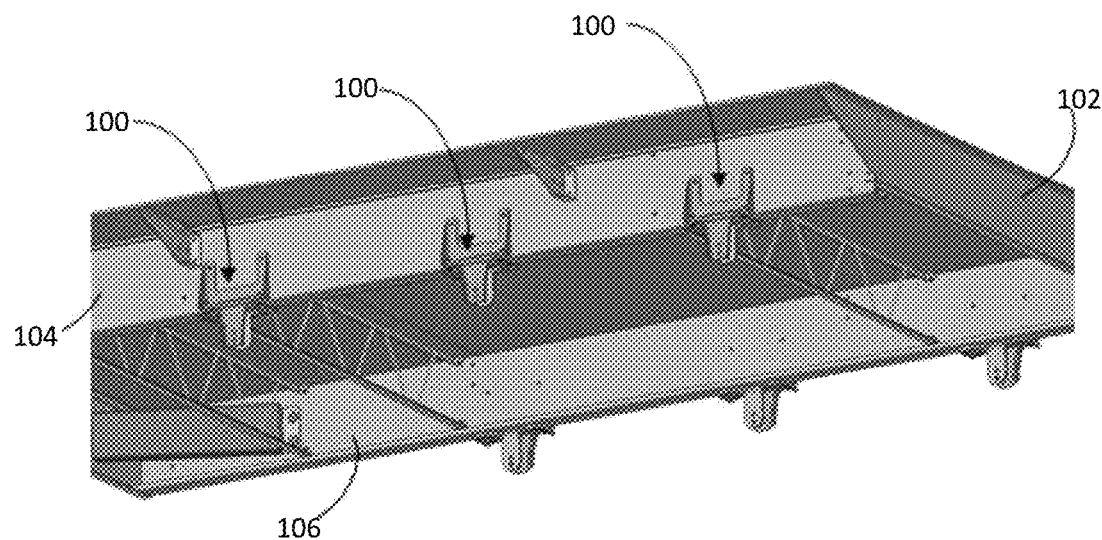
FIG. 1 is a perspective view of an exemplary trailer frame including spring hangers in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

A plurality of spring hangers may be provided on a frame. FIG. 1 illustrates a perspective bottom view of an exemplary arrangement of spring hangers 100 on a trailer frame 102, according to one or more embodiments of the present disclosure. The depicted trailer frame 102 is just one example frame that can suitably incorporate the principles of the present disclosure. Indeed, many alternative designs and configurations of the frame 102 may be employed, without departing from the scope of this disclosure.

Figure 2:
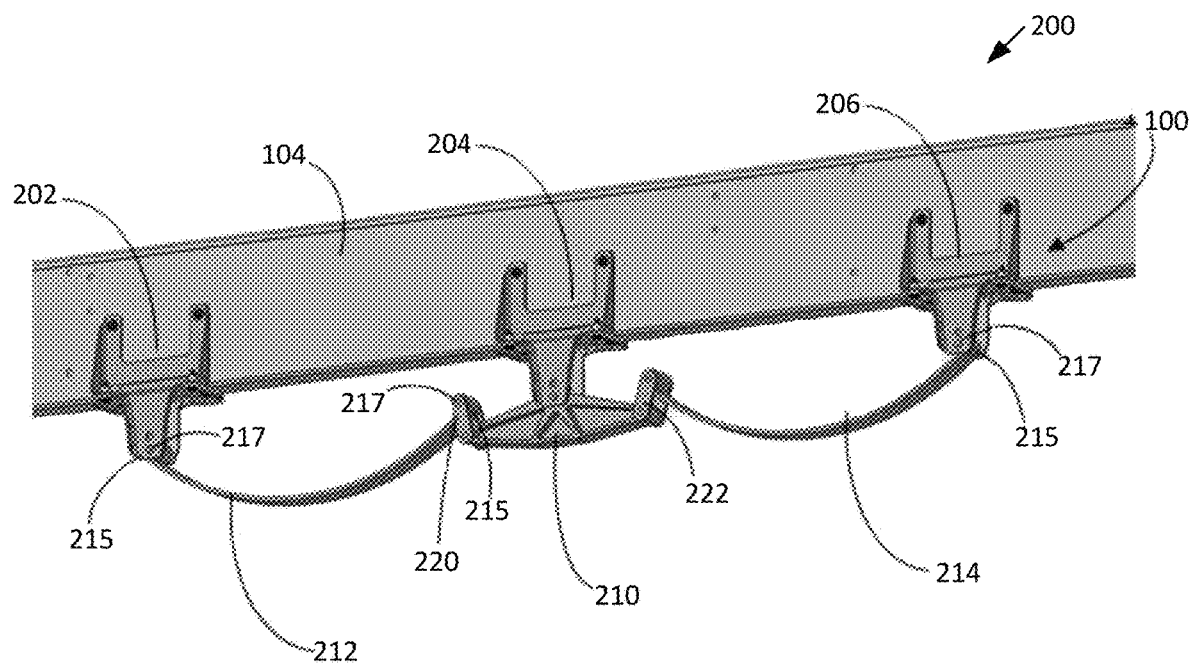
FIG. 2 is a perspective view of an exemplary spring hanger suspension system in accordance with the present disclosure.

With reference to FIGS. 1 and 2, the frame 102 includes a first rail 104 and a second rail 106 extending along a length of a trailer. A spring hanger system 200 may include a plurality of spring hangers 100 aligned along each of the first and second rails 104, 106. In the exemplary embodiments, three (3) spring hangers 100 are provided on each rail 104, 106. However, it is to be appreciated that more or less than three (3) of the spring hangers 100 may be aligned on the first rail 104 and/or the second rail 106.

Spring hangers 100 may be configured to receive various vehicle suspension components. The depicted suspension components FIG. 2 are just one example of suspension components that may be suitably incorporated with the principles of the present disclosure. Indeed, many alternative designs and configurations of suspension components may be employed, without departing from the scope of this disclosure.

As illustrated, the spring hanger assembly system 200 including spring hangers 100 include a left spring hanger 202, a central spring hanger 204, and a right spring hanger 206. Here, an equalizer 210 is attached to the central spring hanger 204. A first leaf spring 212 is arranged between the left spring hanger 202 and the central spring hanger 204, and a second leaf spring 214 is arranged between the right spring hanger 206 and the central spring hanger 204. Each of the first and second leaf springs 212,214 include loops formed at their ends 215 respectively that are configured to couple the first and second leaf springs 212,214 to the spring hangers 100. That is, a fastener 217 may thread through both holes in the hanger 100/suspension component, e.g., shackles 220,222 of equalizer 210, and the end 215 loop of the leaf spring 212, 214, securing each leaf spring 212, 214 to the rail. While not illustrated, wheel assemblies may be installed to the first and second leaf springs 212,214. The length between the left spring hanger 202, the central spring hanger 204, and the right spring hanger 206 may vary depending upon the desired distance between the front and rear wheel assemblies. A left and right shackle 220,222 are provided on the left and right side, respectively, of the equalizer 210, and the left and right shackle 220,220 couple the first and second leaf springs 212,214 to the equalizer 210.

The loop at a first end of the first leaf spring 212 is bolted to the left spring hanger 202 and the loop at the opposing second end of the first leaf spring 212 is bolted to the left shackle 220. The loop at a first end of the second leaf spring 214 is bolted to the right spring hanger 206 and the loop at the opposing second end of the second leaf spring 214 is bolted to the right shackle 222. The equalizer 210 is configured to rock back and forth in the central spring hanger 204, and the shackles 220, 222 coupled to the equalizer 210 permit the leaf springs 212,214 travel axially along the length of the rails, towards and away from the central spring hanger 204, thereby permitting load from the axel to transfer into the suspension.

Figure 3A:
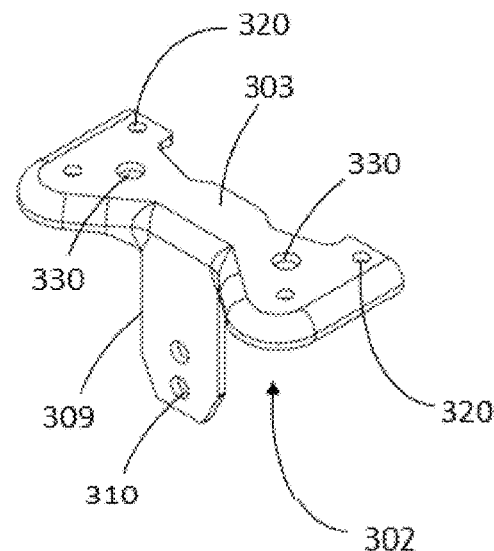
FIG. 3A is a perspective view of an exemplary inner section of a spring hanger in accordance with the present disclosure.
Figure 3B:
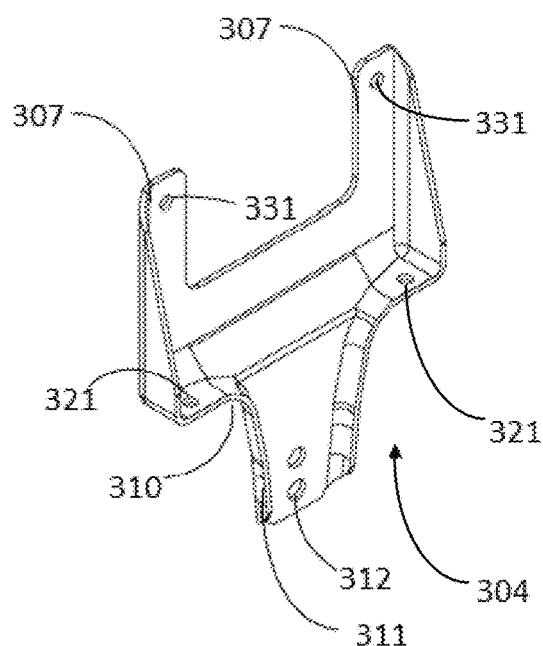
FIG. 3B is a perspective view of an exemplary outer section of a spring hanger in accordance with the present disclosure.
Figure 3C:
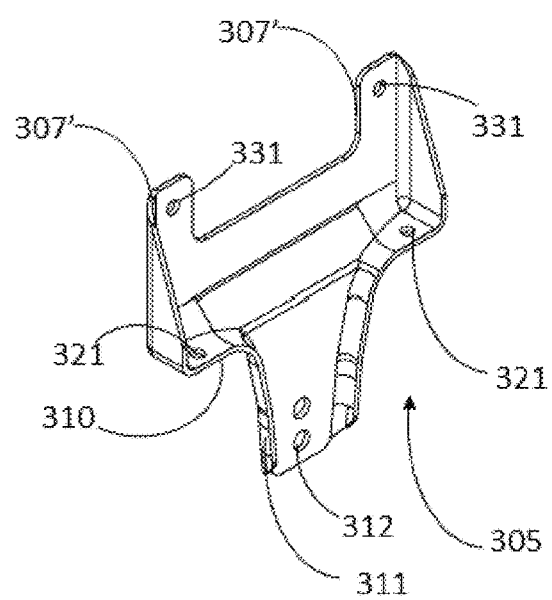
FIG. 3C is a perspective view of another exemplary outer section of a spring hanger in accordance with the present disclosure.

In accordance with the present disclosure, a spring hanger 100, includes of two sections, an inner and outer section. FIGS. 3A-3C illustrate various embodiments of spring hanger 100 sections. An inner hanger section 302 is illustrated in FIG. 3A and outer hanger sections 304 and 305 are illustrated in FIGS. 3B and 3C. The inner hanger section 302 includes a substantially planar top surface 303 configured to abut and mount a bottom surface of a rail 104, 106. The planar top surface 303 also provides a surface for receiving the outer hanger section 304, 305, discussed in greater detail below. The inner hanger section 302 also includes an inner tab portion 309 extending substantially perpendicular to the top surface 303. The inner tab portion 309 includes at least one hole configured to receive a fastener for securing suspension components, e.g., leaf spring, equalizer, etc., in cooperation with corresponding holes on an outer tab portion of an outer hanger section 304, 305.

As illustrated, the outer hanger section 304 includes at least one finger 307 that is configured to abut an exterior surface of the rail 104, 106. The exemplary embodiments of FIGS. 3B and 3C show includes two (2) spaced apart fingers 307, 307'. These fingers 307, 307' may extend substantially perpendicular to a bottom surface 310 of the outer hanger 304, 305. The fingers 307 are configured to extend along a vertical dimension of the rail 104, 106. The fingers 307, 307' may extend vertically at least half way upward along the rail 104, 106, up to about the upper third of the vertical portion of the rail 104, 106. Providing the spring hanger outer hanger section 304 with fingers 307 that extend too high vertically on the rail portion may stiffen the assembly and may result in cracking or other damage; however, providing the fingers 307' too low vertically on the rail portion may result in too much flexibility and may also result in cracking. Thus, in some embodiments, the inner hanger section 302 is provided with standard dimensions, whereas different outer hanger sections 304, 305 may be provided with different finger 307, 307' dimensions.

As mentioned, the outer hanger sections 304, 305 include a substantially planar bottom surface 310 configured to abut the top surface 303 of the inner hanger section 302. Each surface 303, and 310 may have corresponding holes for receiving a fastener for joining the inner hanger section 302 to an outer hanger section 304, 305. The outer hanger section 304, 305, also includes an outer tab portion 311 extending substantially perpendicular to the bottom surface 310 and in an opposite direction from fingers 307, 307'. The outer tab portion 311 includes at least one hole 312 configured to receive a fastener for securing suspension components, e.g., leaf spring, equalizer, etc., in cooperation with corresponding holes 310 on the inner tab portion 309 of the inner hanger section 302.

Figure 4A:
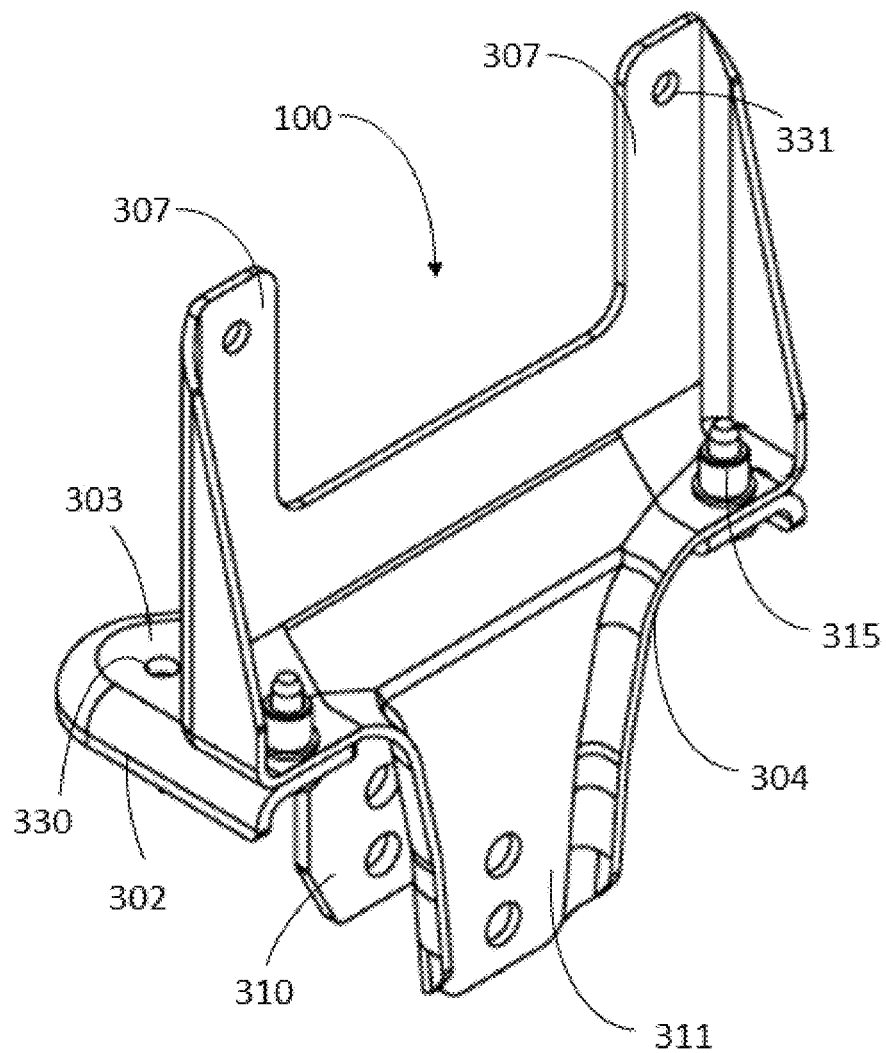
FIG. 4A is a perspective view of an exemplary spring hanger assembly in accordance with the present disclosure.
Figure 4B:
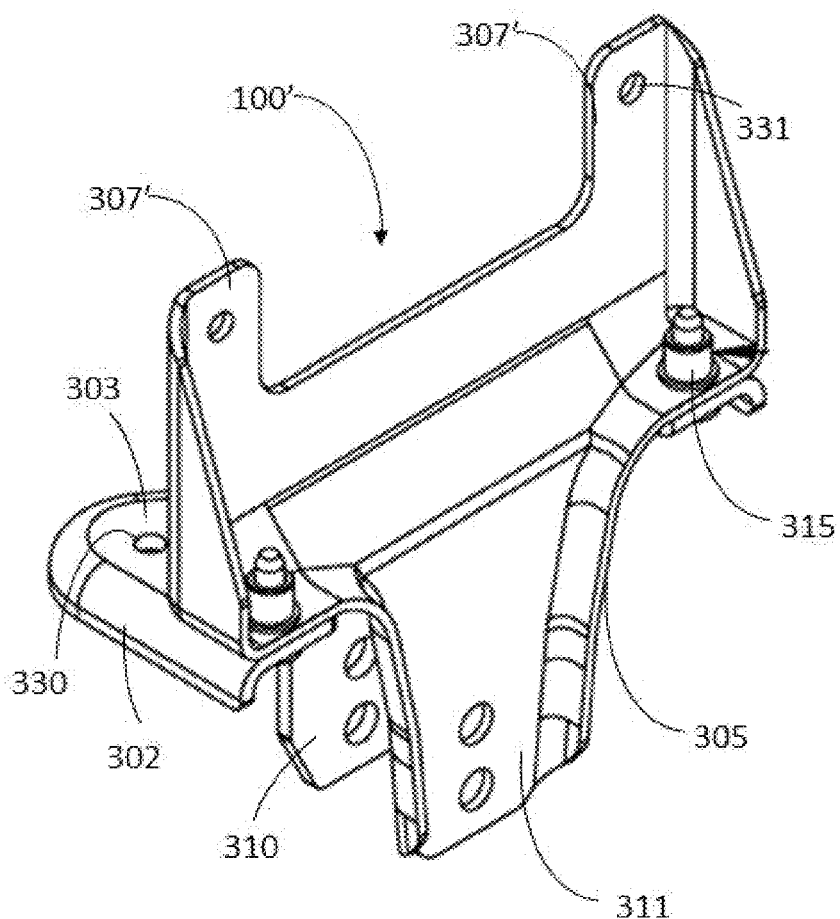
FIG. 4B is a perspective view of another spring hanger assembly in accordance with the present disclosure.

As illustrated in FIGS. 4A and 4B, an inner hanger section 302 may be joined with an outer hanger section, e.g., outer hanger section 304 and/or outer hanger section 305 as a spring hanger assembly 100, 100'. The hanger sections may be in a variety of manners, for example, they may be welded together, bolted together, or hucked together. In the illustrated embodiment of FIG. 4A, spring hanger assembly 100 includes inner hanger section 302 hucked together with outer section 304. As appreciated by those skilled in the art, Huck® fasteners are vibration resistant fasteners including a two-piece grooved pin and a collar combo where the collar sits over the pin and is compressed into the grooves of the pin via a designated tool. The tool presses the softer material collar into the pin making the two-piece combo an integrated one-piece entity. In the illustrated embodiment of FIG. 4B, spring hanger assembly 100' includes inner hanger section 302 hucked together with outer section 305. Also, when inner hanger section 302 and the outer hanger section 304, 305 are joined together, the fingers 307, 307' and bottom surface 303 define a seat that receives a portion of a rail 104.

As mentioned, the outer hanger section may be provided with different finger dimensions to accommodate frames having differently sized rails. FIG. 4A illustrates an example of the outer hanger section 304 having a pair of relatively longer fingers 307, whereas FIG. 4B illustrates an example of the outer hanger section 305 having a pair of shorter fingers 307' relative to those illustrated in FIG. 4A.

Figure 5:
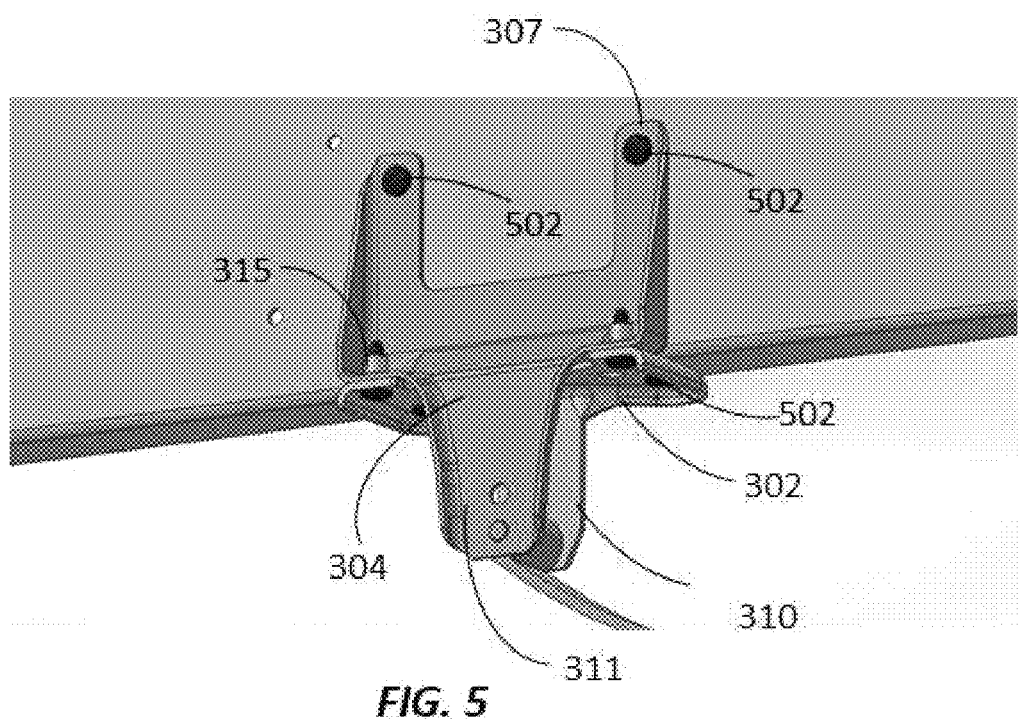
FIG. 5 illustrates a spring hanger assembly installs to a frame rail.

FIG. 5 illustrates a spring hanger utilizing the outer hanger section 304 with longer fingers 307. The inner hanger section 302 and the outer hanger section 304 are hucked together with a pin and collar fastener 315. As illustrated in FIGS. 3-5, each of the inner hanger section 302 and the outer hanger section 304 includes a pair of assembly holes 320, 321, with the assembly holes 320 of the inner hanger section 302 corresponding to the assembly holes 321 of the outer hanger section 304, 305 when they are assembled together. The pin and collar fastener 315 may then be utilized to secure the inner hanger section 302 and the outer hanger section 304, 305 together. In other examples, however, the inner hanger section 302 and the outer hanger section 304, 305 need not include such assembly holes, for example, where the inner hanger section 302 and the outer hanger section 304, 305 are welded together.

With continued reference to FIGS. 3-5, each of the inner hanger section 302 and the outer hanger section 304, 305 include various mounting holes 330, 331 for securing the spring hanger assembly 100 to a rail 104, 106. For example, the inner hanger section 302 may include mounting holes 330 on its top surface 303 and the outer hanger section 304 may include mounting holes 331 on the fingers 307, 307' for attachment to the rail of the frame. As illustrated in FIG. 5, the spring hanger assembly 100 is attached to the rail 104 via fasteners 502 through mounting holes 330 and 331.

Figure 6A:
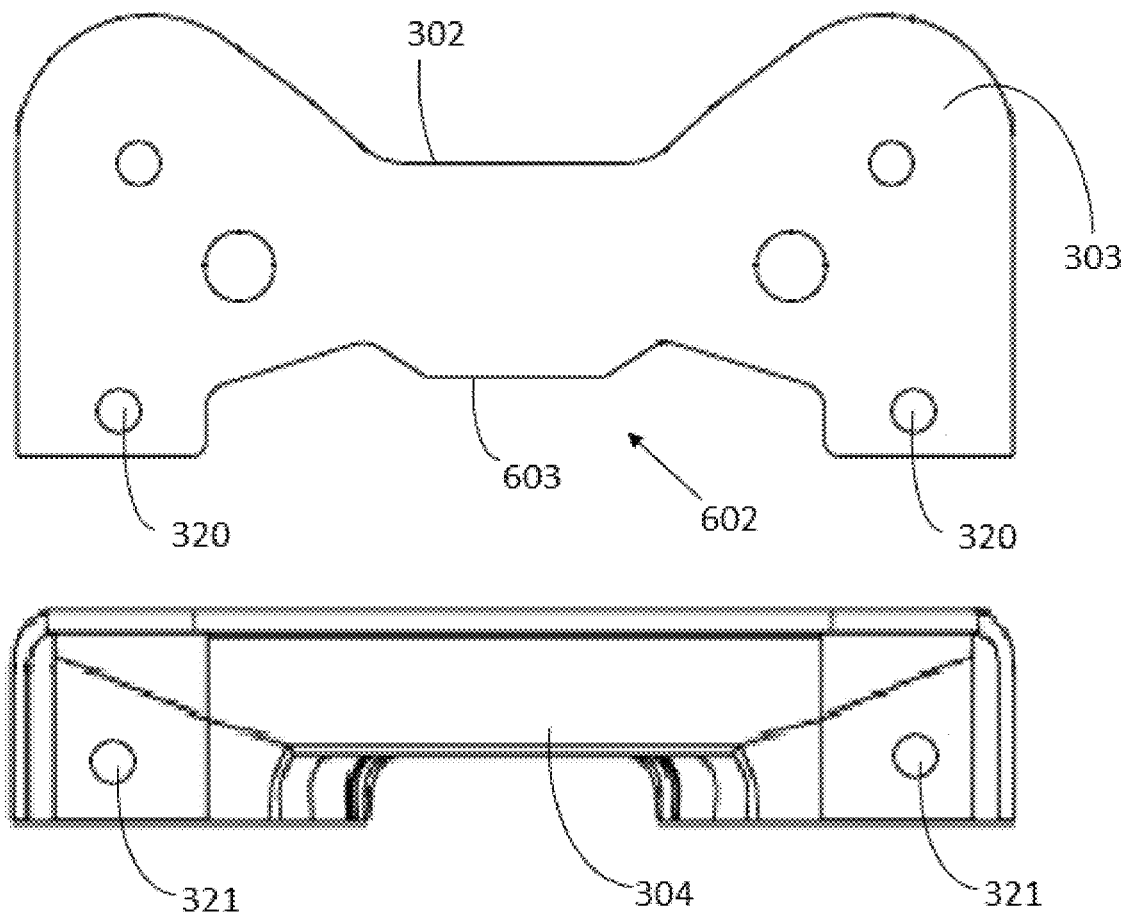
FIG. 6A is a top view of inner and outer spring hanger sections.
Figure 6B:
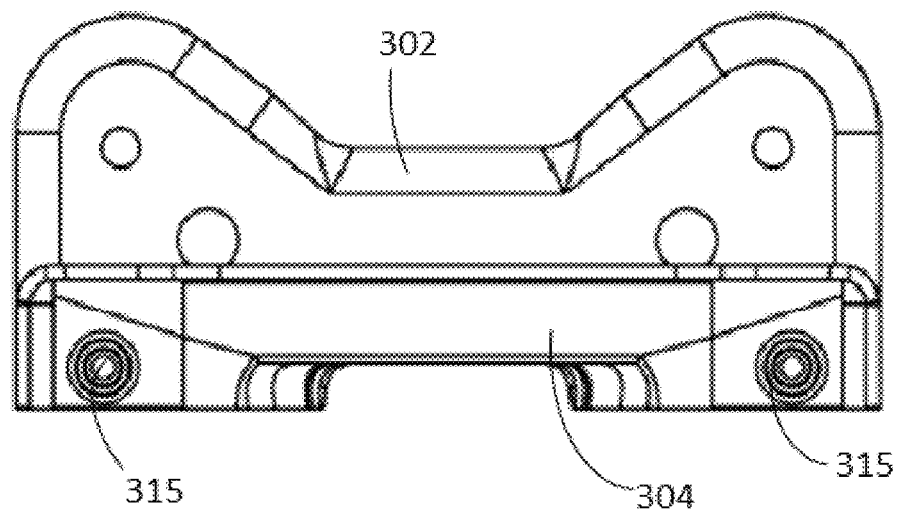
FIG. 6B is a top view of the inner and outer spring hanger sections in a joined configuration

FIGS. 6A and 6B illustrate top view of inner 302 and outer hanger sections 304, 305 separate and joined, respectively. In some embodiments, the inner hanger section 302 includes a recess 602 configured to receive a portion of an outer hanger section 304, 305. The recess 602 is substantially U-shaped and is carved through of the top surface 303 about the side configured to engage the outer hanger section 304, 305. The bottom extending outer tab 311 of the outer section 304 occupies a portion of the recess 602 when the inner hanger section 302 is joined with the outer hanger section 304,305 (as illustrated in FIG. 6A). In some embodiments, the inner hanger section 302 includes a tongue portion 603 of the top surface 303 that projects outwardly therefrom and into the recess 602. The tongue portion 603 may abut an inner facing surface (occluded) of the bottom tab 311. In this way, the tongue portion 603 may aid in maintaining a spaced apart relationship between the bottom tab 310 of the inner hanger section 302 and the bottom tab 311 of the outer hanger section 304, 305.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A hanger assembly, comprising:
   a first hanger section that includes: a first surface, a first tab portion, and a recess; wherein the first tab portion extends in a first direction that is substantially perpendicular to the first surface; and wherein the first surface faces a second direction that is opposite the first direction; and
   a second hanger section that includes a second surface and a second tab portion; wherein the second surface is configured to abut the first surface; wherein the second tab portion extends in the first direction; and wherein the second tab portion occupies a portion of the recess when the second hanger section is joined with the first hanger section.

2. The hanger assembly of claim 1, wherein the first tab portion and the second tab portion are in a spaced apart relationship and are configured to mount a suspension component therebetween.

3. The hanger assembly according to claim 1, wherein the first hanger section and the second hanger section are joined together via a fastener.

4. The hanger assembly according to claim 1, wherein the first surface further comprises a tongue extending into the recess, and wherein the tongue is configured to abut a surface of the second tab portion.

5. The hanger assembly according to claim 1, wherein the second hanger section further comprises at least one finger portion extending from the second surface in a direction opposite the second tab portion.

6. The hanger assembly according to claim 5, wherein the first surface includes a first set of mounting holes, and wherein the at least one finger portion includes a second set of mounting holes.

7. The hanger assembly according to claim 5, wherein a portion of the first surface and a side surface of the at least one finger together define a seat configured to receive a structure for mounting the hanger assembly.

8. A hanger assembly, comprising:
   an inner hanger section that includes a top surface and a first tab portion; wherein the first tab portion extends in a first direction that is substantially perpendicular to the top surface; and
   an outer hanger section that includes: a bottom surface, a second tab portion, and a finger portion; wherein the bottom surface abuts the top surface; wherein the second tab portion extends from the bottom surface in the first direction; wherein the finger portion extends from the bottom surface in a direction opposite the second tab portion; and wherein the finger portion and the top surface together define a seat for mounting the hanger assembly.

9. The hanger assembly of claim 8, further comprising a recess in the top surface, where the second tab portion occupies a portion of the recess when the outer hanger section is joined with the inner hanger section.

10. The hanger assembly of claim 9, wherein the top surface further comprises a tongue extending into the recess, and wherein the tongue is configured to abut an inner facing surface of the second tab portion.

11. The hanger assembly of claim 8, wherein the top surface includes a first set of mounting holes, and wherein the finger portion includes a second set of mounting holes for the mounting of the hanger assembly.

12. The hanger assembly of claim 8, wherein the bottom surface is welded to the top surface.

13. The hanger assembly of claim 8, wherein the first tab portion has a first hole that corresponds with a second hole positioned in the second tab portion.

14. The hanger assembly of claim 13, wherein the first hole and the second hole are configured to receive a fastener for securing a suspension component.

15. A hanger assembly, comprising:
   an inner hanger section that includes: a recess defined in a top surface of the inner hanger section, and a first tab portion; wherein the first tab portion extends in a first direction that is substantially perpendicular to the top surface; and
   an outer hanger section that includes: a bottom surface, a second tab portion, and a finger portion; wherein the second tab portion and the finger portion extend from the bottom surface in opposite directions; and wherein the finger portion and the top surface together define a seat configured to receive a structure for mounting the hanger assembly.

16. The hanger assembly of claim 15, further comprising a recess in the top surface, wherein the second tab portion occupies a portion of the recess when the outer hanger section is joined with the inner hanger section.

17. The hanger assembly of claim 16, wherein the top surface further comprises a tongue extending into the recess, and wherein the tongue is configured to abut an inner facing surface of the second tab portion.

18. The hanger assembly of claim 15, wherein the top surface includes a first set of mounting holes, and wherein the finger portion includes a second set of mounting holes for the mounting of the hanger assembly.

19. The hanger assembly of claim 15, wherein the first tab portion has a first hole that corresponds with a second hole positioned in the second tab portion, and wherein the first hole and the second hole are configured to receive a fastener for securing a suspension component.

* * * * *